United States Patent
Soundararajan et al.

(10) Patent No.: US 12,190,114 B2
(45) Date of Patent: Jan. 7, 2025

(54) SEGMENTED BRANCH TARGET BUFFER BASED ON BRANCH INSTRUCTION TYPE

(71) Applicant: Intel Corporation, Santa Clara, CA (US)

(72) Inventors: Niranjan Kumar Soundararajan, Karnataka (IN); Sreenivas Subramoney, Bangalore (IN); Sr Swamy Saranam Chongala, Andhra Pradesh (IN)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 17/130,016

(22) Filed: Dec. 22, 2020

(65) Prior Publication Data
US 2022/0197657 A1 Jun. 23, 2022

(51) Int. Cl.
G06F 9/38 (2018.01)
(52) U.S. Cl.
CPC .......... G06F 9/3806 (2013.01); G06F 9/3844 (2013.01)
(58) Field of Classification Search
CPC ............................ G06F 9/3806; G06F 9/3844
See application file for complete search history.

(56) References Cited

U.S. PATENT DOCUMENTS

| | | | |
|---|---|---|---|
| 5,442,756 A | 8/1995 | Grochowski et al. | |
| 5,909,573 A | 6/1999 | Sheaffer | |
| 5,938,761 A * | 8/1999 | Patel | G06F 9/3806 |
| | | | 712/238 |
| 6,256,728 B1 | 7/2001 | Witt et al. | |
| 6,601,161 B2 * | 7/2003 | Rappoport | G06F 9/30061 |
| | | | 712/238 |
| 6,772,325 B1 * | 8/2004 | Irie | G06F 9/3846 |
| | | | 712/237 |
| 6,874,081 B2 * | 3/2005 | Kruckemyer | G06F 9/3806 |
| | | | 712/E9.075 |
| 7,673,122 B1 | 3/2010 | Song et al. | |

(Continued)

FOREIGN PATENT DOCUMENTS

WO 2019162647 A1 8/2019

OTHER PUBLICATIONS

Intel Corporation, "Intel® 64 and IA-32 Architectures Software Developer's Manual, Chapter 2, 2-1 to 2-4," Oct. 2019, 5 pages total.

(Continued)

*Primary Examiner* — Shawn Doman
(74) *Attorney, Agent, or Firm* — Nicholson De Vos Webster & Elliott LLP

(57) ABSTRACT

In one embodiment, a processor includes a branch predictor to predict whether a branch instruction is to be taken and a branch target buffer (BTB) coupled to the branch predictor. The branch target buffer may be segmented into a first cache portion and a second cache portion, where, in response to an indication that the branch is to be taken, the BTB is to access an entry in one of the first cache portion and the second cache portion based at least in part on a type of the branch instruction, an occurrence frequency of the branch instruction, and spatial information regarding a distance between a target address of a target of the branch instruction and an address of the branch instruction. Other embodiments are described and claimed.

10 Claims, 12 Drawing Sheets

(56) References Cited

U.S. PATENT DOCUMENTS

| | | | |
|---|---|---|---|
| 7,676,663 B2* | 3/2010 | Prasky | G06F 9/381 |
| | | | 712/240 |
| 2002/0157000 A1 | 10/2002 | Hay et al. | |
| 2004/0172524 A1* | 9/2004 | Hoogerbrugge | G06F 9/3806 |
| | | | 712/238 |
| 2005/0066153 A1* | 3/2005 | Sharangpani | G06F 9/3806 |
| | | | 712/E9.052 |
| 2005/0144427 A1* | 6/2005 | Col | G06F 9/30054 |
| | | | 712/E9.075 |
| 2008/0040590 A1* | 2/2008 | Lee | G06F 9/30145 |
| | | | 712/238 |
| 2009/0177875 A1* | 7/2009 | Moyer | G06F 9/322 |
| | | | 712/E9.055 |
| 2010/0161950 A1 | 6/2010 | Caprioli et al. | |
| 2011/0093658 A1* | 4/2011 | Zuraski, Jr. | G06F 9/3844 |
| | | | 711/E12.017 |
| 2012/0324209 A1* | 12/2012 | Tran | G06F 9/3806 |
| | | | 712/234 |
| 2013/0290640 A1* | 10/2013 | Aggarwal | G06F 1/32 |
| | | | 712/205 |
| 2014/0164748 A1* | 6/2014 | Dundas | G06F 9/3804 |
| | | | 712/237 |
| 2014/0250289 A1* | 9/2014 | Pota | G06F 9/3806 |
| | | | 712/240 |
| 2017/0090935 A1* | 3/2017 | Falsafi | G06F 12/0875 |
| 2017/0315810 A1* | 11/2017 | Eickemeyer | G06F 9/322 |
| 2018/0060073 A1 | 3/2018 | Havlir | |
| 2019/0065375 A1* | 2/2019 | Al Sheikh | G06F 12/1063 |
| 2019/0205135 A1* | 7/2019 | Nori | G06F 9/3814 |
| 2019/0384609 A1 | 12/2019 | McLellan et al. | |
| 2020/0004542 A1* | 1/2020 | Chauhan | G06F 9/30058 |
| 2020/0012497 A1 | 1/2020 | Clouquer et al. | |
| 2020/0081717 A1* | 3/2020 | Orion | G06F 9/3848 |
| 2020/0371944 A1* | 11/2020 | Dundas | G06F 9/3804 |
| 2021/0004233 A1* | 1/2021 | Kumar | G06F 9/3858 |
| 2021/0406183 A1* | 12/2021 | Mashimo | G06F 9/30047 |
| 2022/0350608 A1* | 11/2022 | Asano | G06F 9/3844 |

OTHER PUBLICATIONS

Rakesh Kumar, et al., "Blasting Through the Front-End Bottleneck With Shotgun," ASPLOS '18, Mar. 24-28, 2018, 13 pages total.

Narasimha Adiga, et al., "The IBM z15 High Frequency Mainframe Branch Predictor," 2020, 13 pages total.

United States Patent Office, Restriction Requirement dated Feb. 1, 2024 in U.S. Appl. No. 17/130,028 (11 pages).

United States Patent Office, Response to Restriction Requirement filed Feb. 7, 2024 in U.S. Appl. No. 17/130,028 (11 pages).

European Patent Office, Search Report mailed Dec. 23, 2021 in European Patent Application No. 21194789.0 (6 pages).

European Patent Office, Search Report mailed Feb. 2, 2022 in European Patent Application No. 21195911.9 (8 pages).

U.S. Appl. No. 17/130,028, filed Dec. 22, 2020, entitled "Accessing a Branch Target Buffer Based on Branch Instruction Information," by Niranjan Kumar Soundararajan, et al.

United States Patent Office, Non-Final Office Action dated Apr. 11, 2024 in U.S. Appl. No. 17/130,028 (46 pages).

European Patent Office, Communication Pursuant to Article 94(3) EPC dated Jul. 5, 2024 in European Patent Application No. 21195911.9 (6 pages).

United States Patent Office, Reply to Office Action filed Jul. 30, 2024 in U.S. Appl. No. 17/130,028 (27 pages).

European Patent Office, Communication Pursuant to Article 94(3) EPC dated Jun. 25, 2024 in European Patent Application No. 21194789.0 (5 pages).

* cited by examiner

SEGMENTED BRANCH TARGET BUFFER BASED ON BRANCH INSTRUCTION TYPE

TECHNICAL FIELD

Embodiments relate to design and use of a branch target buffer in a processor.

BACKGROUND

In modern processors, a Branch Target Buffer (BTB) is a memory within a processor core that caches target locations of different branch instructions. When a branch predictor of the core predicts a branch to be taken, the target location is read from the BTB, which is the location of the next instruction to be fetched and executed. Any misprediction in the BTB results in a misprediction penalty that is later fixed either by a branch address computation (BAC) at decode for direct branches or post-branch execution for indirect branches. In multiple high code-footprint workloads that are becoming increasingly common, BTB mispredictions can lead to performance penalties related to front-end stalls and re-steering that can adversely impact total execution time.

DETAILED DESCRIPTION

Figure 1:
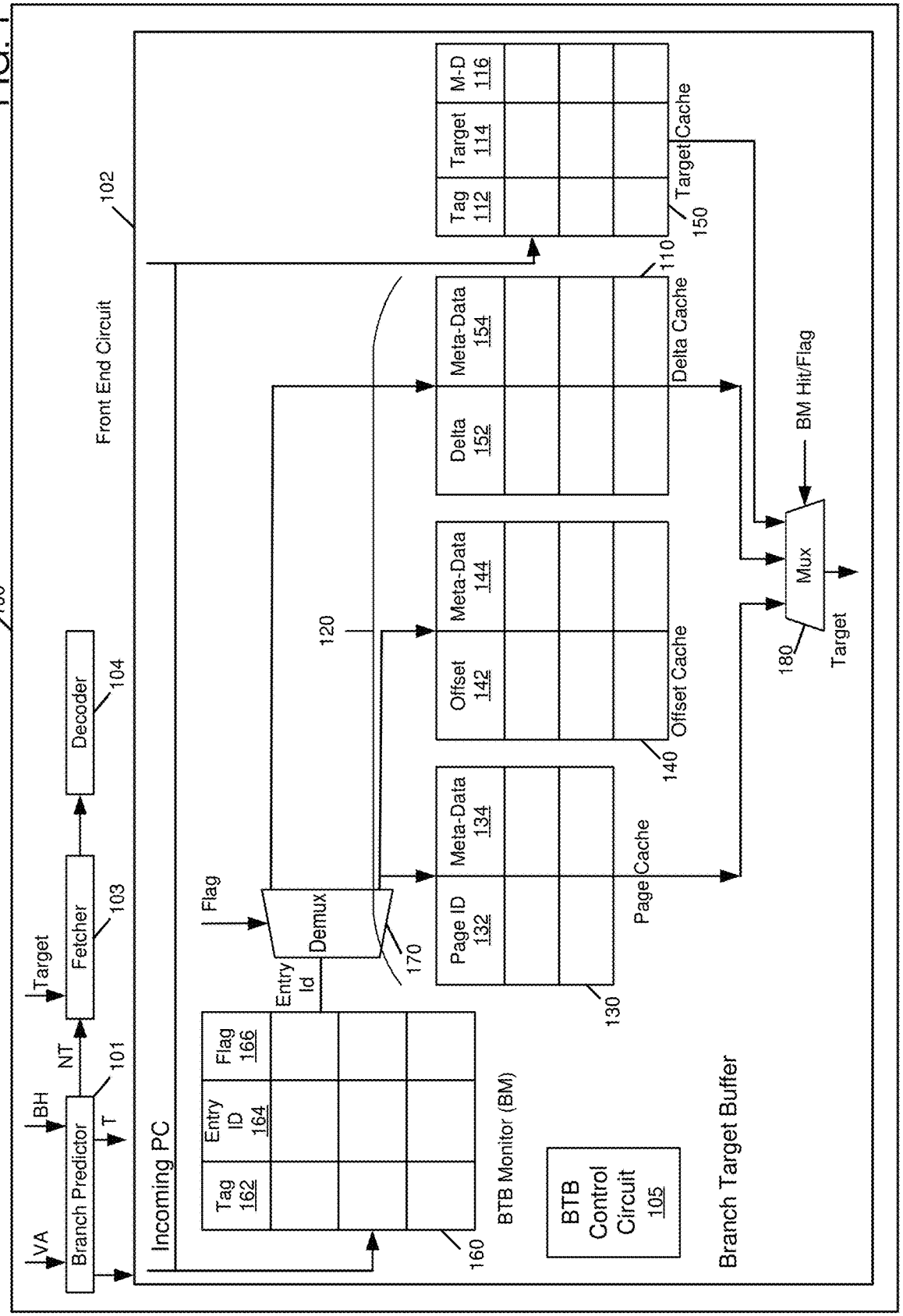
FIG. 1 is a block diagram of a processor core in accordance with an embodiment.

In various embodiments, a processor includes a branch target buffer (BTB) having an arrangement that leverages information regarding different types of branch instructions, to improve BTB performance and reduce BTB size. More specifically, in embodiments a BTB may be arranged with multiple independent memory structures to store branch target information and other metadata associated with branch instructions based on a given branch instruction type. Still further, some embodiments may leverage information provided in branch instructions, such as one or more fields included in branch instructions of a given instruction set architecture (ISA), to enable allocation and target prediction in accordance with an embodiment. Understand that while particular BTB configurations and branch instructions are presented herein, embodiments are not limited to these examples, and various BTB configurations and branch instructions may leverage embodiments.

In embodiments, a BTB may be configured to store information regarding different types of branch instructions in different independent portions of a BTB. Such disparate direction of different types of branch instructions may be based on the different behavior expected from these different instruction types. More specifically, there can be high locality amongst frequently occurring branch targets when they are examined based on code regions in which they occur. These regions of code often span multiple cache lines. Further, depending on branch type, the branch occurrence frequency and typical distance between branches and their targets can vary greatly. Conventional BTB microarchitectures do not exploit or optimize for such phenomena. With embodiments, BTB mispredictions can be reduced using page and branch target hotness (e.g., most frequently occurring) information.

This is so, as different branch types vary in terms of their occurrence frequency (temporal information), the typical distance from their targets and the number of different targets they see. For example, direct branches are the most frequent type of branches. Direct jumps and direct conditional branches most often see their targets within the same page as the branch program counter (PC) (namely the address of the branch instruction), while direct calls typically see their targets located in a page different from the one in which the branch PC occurs. Indirect branches do not occur often, but have a relatively high miss rate compared to other branch types.

With embodiments, a BTB structure is arranged with cognizance of the branch type and hot regions where the branch targets fall. In one particular implementation, a BTB can have at least two independent cache structures, referred to herein as a hot cache and a target cache. The hot cache may be configured to store branch target information for highly occurring direct branches, which in an embodiment may include direct jumps and calls, and direct conditional branches. In one implementation, the hot cache can be split into two components, namely a so-called delta cache and a page/offset cache, which itself may include separate cache structures.

With this configuration, the delta cache may be used to store direct jumps and conditional branches whose targets are typically within the same memory page as the branch (e.g., a 4 kilobyte (kB) page). In turn, the page cache/offset cache may be used to store direct calls whose targets are typically in a different page. There can be locality in terms of repeating pages where these targets happen. The offset cache helps capture the specific location within the page in which the target is located (like the location of a function that is called). Splitting the target information into page and offset allows this information to be reused across several branches that transfer control to the same target.

In turn, the target cache may be used to store branch target information for less frequently used branch instructions which may include indirect branches and less frequently occurring direct branches. Given that direct branches are mostly captured in the delta and page/offset caches, these less frequently occurring branches have more chance of being retained and therefore result in a reduction in their miss rate as well.

Referring now to FIG. 1, shown is a block diagram of a processor core in accordance with an embodiment. Specifically as shown in FIG. 1, a front end circuit 100 of a processor core may include a branch predictor 101, a BTB 102, an instruction fetch circuit (fetcher) 103, and an instruction decode circuit (decoder) 104. Fetcher 103 may fetch instructions for decoder 104 to decode. Understand that additional components may be present within front end circuit 100, in some implementations. In relevant aspects herein, branch predictor 101 may include various branch prediction tables and control circuitry that receives incoming information, including a virtual address (VA) of a given instruction, along with branch history information, which may be used to update the tables within branch predictor 101.

When a given VA hits within branch predictor 101, a branch prediction may be obtained. In embodiments herein, this prediction may be a prediction of a taken path or a not taken path. When a prediction is a taken prediction, a virtual address is provided to BTB 102 as an incoming program counter (PC) value. This PC can be hashed to obtain a tag, which is used to access information stored in various structures of BTB 102, as described further below. In an embodiment, a BTB control circuit 105 may perform such hash to generate the tag. Also as described herein, BTB control circuit 105 may control allocations and updates of entries within the various structures of BTB 102 according to a type of branch instruction, among in addition to other information such as hint information described herein, which may be received from decoder 104 post instruction decode.

More specifically as shown in FIG. 1, BTB 102 includes separate structures, including a target cache 110 and a hot cache 120. In turn hot cache 120 is formed of a page cache 130, an offset cache 140, and a delta cache 150. Hot cache 120 may be used to help capture the target PC information for direct branches. Since the targets can be in the same page or across different pages, the information is captured either in delta cache 150 or in page cache 130 and offset cache 140 (also generically referred to as a page/offset cache). In an embodiment, delta cache 150 captures the target when the target is in the same page. To this end, each entry may be 12 bits to capture all possible distances within a page Collectively, page cache 130 and offset cache 140 may capture targets when the PC and target are on different pages. The 52 bit page information is stored in page cache 130 while offset cache 140 stores the 12 bit offset within the 4K page.

As further shown, a BTB monitor 160 (also referred to as a monitor circuit) may be coupled to these various caches to provide information used to access a particular structure (e.g., hot cache or target cache). BTB monitor 160 captures an entry for all direct branches which get allocated in the hot caches. Each entry captures the entry ID in the delta cache or the page/offset cache. An additional flag bit helps distinguish the entry as belonging to the delta cache or the page and offset caches. BTB monitor 160 provides a quick way to identify if a direct branch is captured in hot cache 120. In an embodiment, BTB monitor 160 is PC-indexed and uses a 16 bit tag to identify the specific entry.

As illustrated, each portion of BTB 102 may store different information in its entries. Specifically, target cache 110 may have a plurality of entries or lines, each having a tag field 112 to store a tag, a target field 114 to store a target address for a branch instruction associated with the tag, and a metadata field 116 to store metadata. In turn, page cache 130 includes a plurality of entries each having a page ID field 132 to store page information of a target and a metadata field 134 to store metadata, which may include usefulness information and recency information such as age. Similarly, offset cache 140 includes a plurality of entries each having an offset field 142 to store offset information of a target and a metadata field 144 to store metadata. In turn, delta cache 150 includes a plurality of entries each having a delta field 152 to store delta information (namely a distance between branch and target instructions) and a metadata field 154 to store metadata. As further shown, BTB monitor 160 also may include multiple entries each to store a tag field 162, an entry ID field 164, and a flag field 166. In embodiments, the entry ID may identify a relevant entry within one or more of caches in hot cache 120. In turn the flag may be used as an input to a selection circuit 170, implemented as a demultiplexer, which provides an indication as to whether information for a given instruction is stored in the page and offset caches or the delta cache.

As further shown in FIG. 1, BTB 102 further includes another selection circuit 180, which may be implemented as a multiplexer. Selection circuit 180 receives output information in form of branch target information from various caches and based on a hit indicator and the flag from BTB monitor 160 selects given branch target information for output. In an embodiment, BTB 102 may output this branch target information to a fetch circuit to fetch instructions from a target address indicated by the branch target information.

Target cache 110 may be structured like a conventional BTB but is much smaller in size. Target cache 110 is primarily used to capture indirect branches that are not as frequent compared to direct branches and also infrequently occurring direct branches. It is PC-indexed and a 16 bit tag is used to identify the specific entry.

While FIG. 1 details a particular BTB organization, there are other alternate design options possible. For example, in another embodiment, the BTB storage is not split into explicit offset and delta caches. Rather, a single large offset cache that is double the storage size is maintained, and the entries are interpreted based on branch type information captured in the BTB monitor or directly from the incoming PC. Based on workload characteristics, the same structure can be dynamically utilized to capture more offsets or deltas, which may lead to an even higher miss rate reduction.

In yet another alternate configuration, the target cache can be organized more like the other hot-caches such that it is also tagless to lower storage requirements. On this organization, rather than accessing the BTB monitor and target cache in parallel, the BTB monitor can first be accessed to identify the structure holding the branch target and then the individual tables are accessed to provide it.

In yet another implementation, the BTB may be organized to allocate branches based on their type, instead of using the delta and offset caches based on branch PC and target distance. Since direct conditional branches and direct jumps mostly have their targets in the same page, their targets can be stored in the delta cache. Direct calls, on the other hand, have most of their targets in a different page and thus such targets can be stored in the offset cache. If the targets can not be captured in the respective tables due to the branch-to-target distance, the target cache can be allocated with the branch target.

Table 1 lists the number of entries in the different components of an example BTB and compares it with a conventional BTB. As seen, both are similarly sized, with a BTB in accordance with one embodiment consuming ~2 KB less storage.

TABLE 1

| Component | Per Entry (bits) | Num Entries | Overall Storage (KB) |
|---|---|---|---|
| BTB Monitor | 36 | 8192 | 36 |
| Page Cache | 56 | 512 | 3.5 |
| Offset Cache | 16 | 768 | 1.5 |
| Delta Cache | 16 | 580 | 1.13 |
| Target Cache | 88 | 4096 | 44 |
| APT-BTB (Total Storage) | | | 86.13 |
| Baseline/Conventional BTB | 88 | 8192 | 88 |

Target prediction from the BTB may occur using an incoming PC to access both the target cache and the BTB monitor in parallel. If the PC is of an indirect branch, only the target cache can provide a prediction. Otherwise, depending on the table in which it hits, the target is given.

Figure 2:
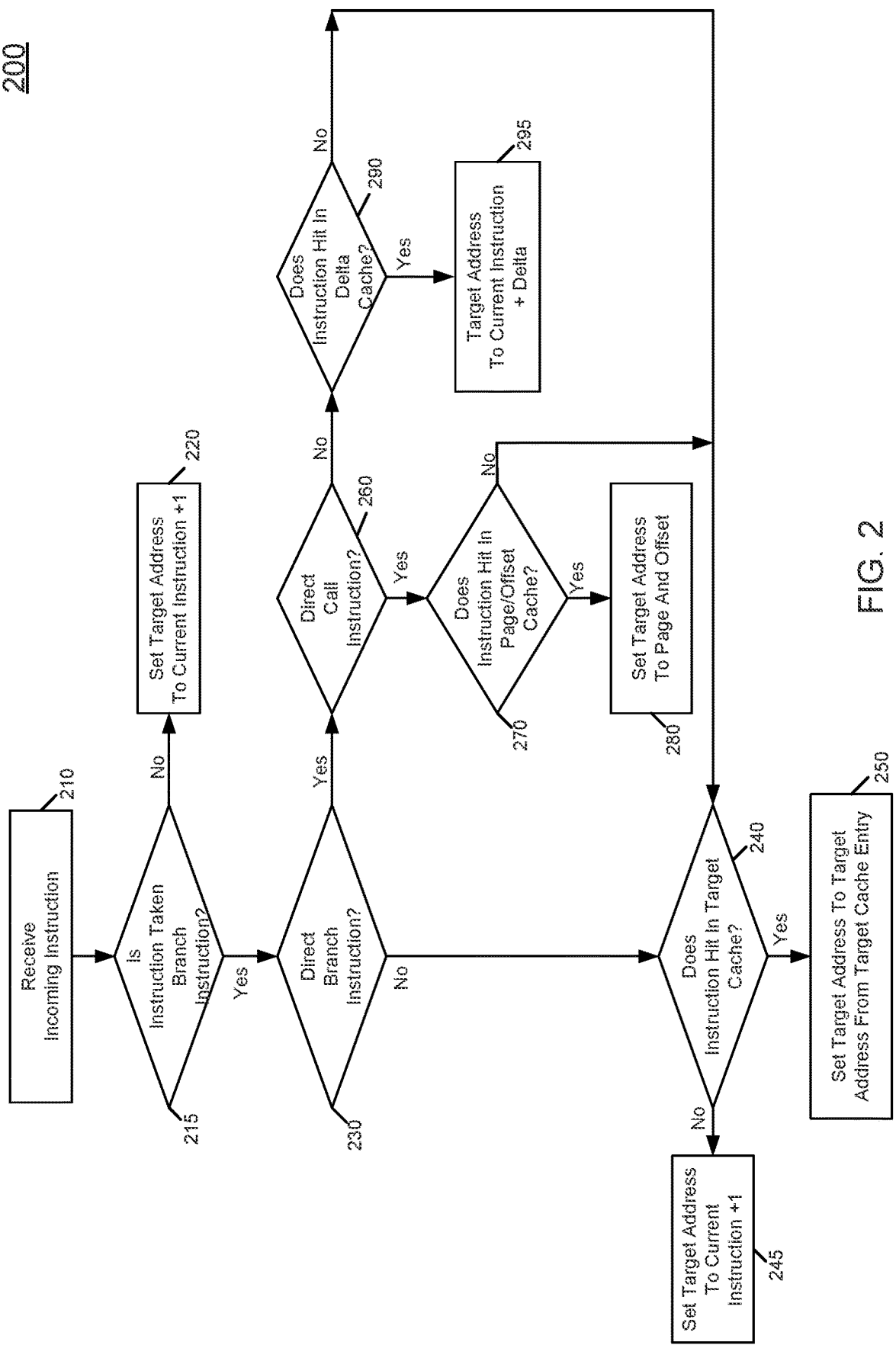
FIG. 2 is a flow diagram of a method in accordance with an embodiment.

Referring now to FIG. 2, shown is a flow diagram of a method in accordance with an embodiment. As shown in FIG. 2, method 200 is a method for a target prediction process for determining a target address for a taken branch instruction based at least in part on information present in a branch target buffer. As such, method 200 may be performed by hardware circuitry of a branch predictor, such as a control circuit along with associated BTB hardware and a BTB control circuit, alone or in combination with firmware and/or software.

As illustrated, method 200 begins by receiving an incoming instruction (block 210). Next, it is determined whether the instruction is a taken branch instruction (diamond 215), which may be done in the branch predictor. If not, a target address can be set to an incremented value of a current instruction (e.g., PC+1) (block 220).

Instead if it is determined that the instruction is a branch instruction that is to be taken, control next passes to diamond 230 to determine whether it is a direct branch instruction. In an embodiment, this determination may be made based on the type of instruction and/or hint information included in the instruction. If not, control passes to diamond 240 to determine whether the instruction hits in a target cache of the BTB. If not, the target address can be set to an incremented value of the current instruction (e.g., PC+1) (block 245). Otherwise if it is determined that the instruction does in fact hit in the target cache, the target address may be set to the target address obtained from the hit entry within the target cache (block 250).

Still with reference to FIG. 2 if the branch instruction is determined to be a direct branch instruction, control instead passes to diamond 260 to determine whether it is a direct call instruction. If so, next it is determined at diamond 270 whether the instruction hits in a page/offset cache. If so, control passes to block 280, where the target address may be set to the target address obtained from the hit entry within the page/offset cache, namely a given page and offset.

Still with reference to FIG. 2, if the branch instruction is another type of direct branch, control passes to diamond 290, where it is determined whether the instruction hits in a delta cache. If not, control passes to diamond 240, discussed above. When it is determined that the branch instruction hits in the delta cache, control passes to block 295, where the target address can be set to a value of the current instruction and a delta value provided from the hit entry of the delta cache, which leads to another location in the same page. Understand while shown at this high level in the embodiment of FIG. 2, many variations are possible.

Target update/allocation to the BTB may be performed post decode stage for direct branches or post-execution for indirect branches, where the actual branch target is available. If the target is predicted from the hot caches, and the prediction is highly accurate, the target cache entry corresponding to the PC is invalidated. This allows the entry to be reused. If the target is predicted from the target cache, for direct branches, an attempt is made to allocate the entry in the hot caches. If the PC was missed completely, allocation will be made in the hot caches and BTB monitor and target cache. Note that not all allocation attempts are successful since entries are reserved for hot PCs.

Figure 3:
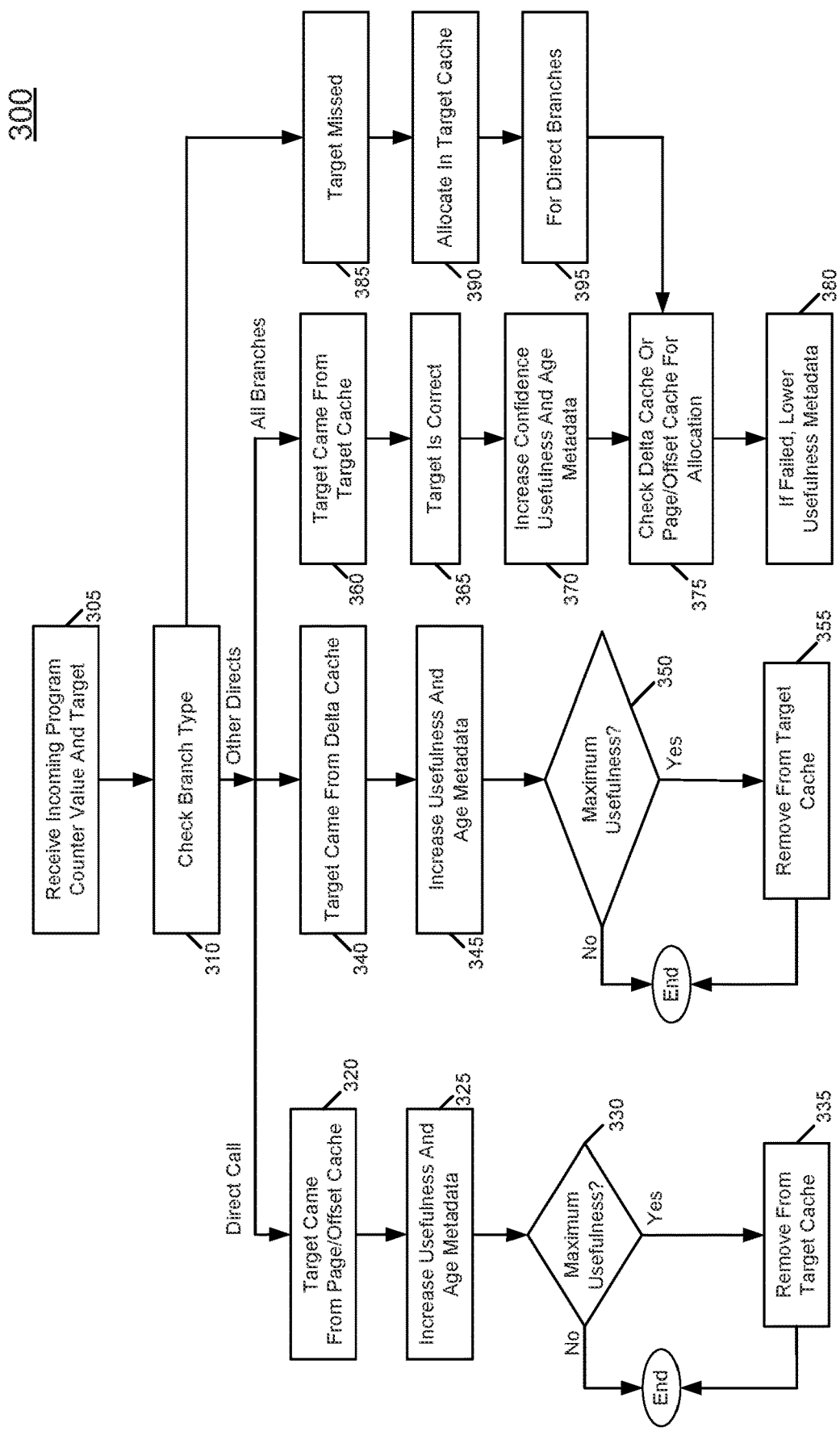
FIG. 3 is a flow diagram of a method in accordance with another embodiment.

Referring now to FIG. 3, shown is a flow diagram of a method in accordance with another embodiment. More specifically, method 300 of FIG. 3 is a method for performing a target update process in accordance with an embodiment. As such, method 300 may be performed by hardware circuitry of, e.g., a BTB control circuit, alone or in combination with firmware and/or software.

As illustrated, method 300 begins by receiving an incoming program counter value and a target address (block 305). Note that this information may be obtained once a correct target is known based on information available post-branch address calculation stage. Next at block 310 a type of branch instruction is identified. If it is determined that the branch type is a direct call, control passes to block 320 where it is determined whether the target address was obtained from a page/offset cache (block 320). If so, control passes to block 325 where various metadata associated with the entry within the page/offset cache can be updated. Specifically as shown, at block 325 usefulness and age metadata may be updated, e.g., increased, to identify greater usefulness as well as to indicate more recent usage. Next it is determined at diamond 330 whether a maximum usefulness has been reached. If so, at block 335 a corresponding entry for this program counter value can be removed from a target cache.

Still with reference to FIG. 3 instead if it is determined that the branch instruction is another type of direct instruction (not a direct call), control passes to block 340. There, it is determined whether the target address was obtained from a delta cache (block 340). If so, control passes to block 345 where various metadata (e.g., usefulness and age metadata) associated with the entry within the delta cache can be updated. Next it is determined at diamond 350 whether a maximum usefulness has been reached. If so, at block 355 a corresponding entry for this program counter value can be removed from the target cache.

Otherwise if it is determined that the branch instruction is another type of branch, control passes to block 360. At block 360, it is determined whether the target address was obtained from the target cache. If so, control passes to block 365 to determine whether the target was correct. If so, at block 370 various metadata (e.g., confidence value, usefulness and age metadata) associated with the entry within the target cache can be updated. Note that usefulness metadata is an indication of maximum confidence. Once an entry reaches maximum confidence, this usefulness indicator is set. But that entry might see mispredictions post that setting, which lowers the confidence. A set useful indicator helps distinguish between an older entry that is mispredicting versus a new entry that is allocated and is building confidence. Next it is determined at block 375 whether information for this entry can be allocated to the delta cache or the page/offset cache. If this allocation operation fails, at block 380 the usefulness metadata can be decremented.

Still with reference to FIG. 3, if it is determined at block 385 that the branch instruction missed within the BTB, control passes to block 390 where the branch instruction may be allocated within the target cache. Furthermore, when it is determined that the corresponding branch instruction is a direct branch (as determined at block 395), the operations shown at block 375 may be performed. Specifically, if entries are available in the hot caches (delta cache and/or page/offset cache), this branch instruction may be allocated to one of the delta cache or the page/offset cache.

Understand while shown at this high level in the embodiment of FIG. 3, many variations and alternatives are possible. For example, while control circuitry of the branch target buffer can identify particular instruction types and use such information in both target prediction and target update, in other cases hint information provided in connection with the branch instructions themselves can be used to more optimally to perform allocation.

That is, to exploit the configuration of a BTB in accordance with an embodiment, hint information may be provided within at least some branch instructions of a given ISA to allow a compiler and/or software to guide the expected location of the target. This can be used to optimize the utilization of the BTB structures.

With such ISA-based hint information, a user or compiler can optimally guide the allocation and updates to the BTB. The above-described default policy may have limited view of the program code and hence can make sub-optimal choices, but performance still is much better than a conventional BTB organization. The BTB can be enhanced with ISA extensions to optimally allocate branches based on individual workload characteristics. This extension information can be received from a user, with knowledge of the code access profile, or from a compiler combined with some profiling information. For enterprise and HPC workloads, that do the same task for long periods, prior profiling information can be a very useful guide to place targets optimally.

Figure 4:
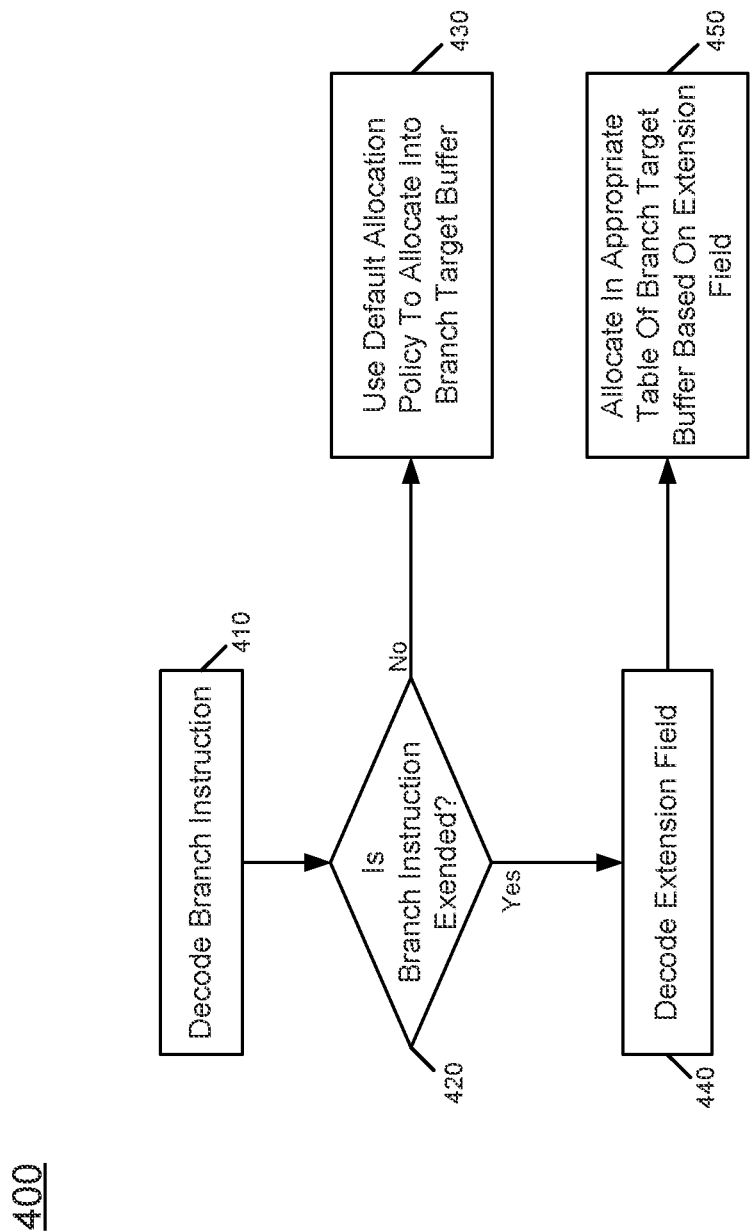
FIG. 4 is a flow diagram of a method in accordance with another embodiment.

Referring now to FIG. 4, shown is a flow diagram of a method in accordance with another embodiment. More specifically, method 400 of FIG. 4 is a high level illustration of use of information included in branch instructions of an ISA to enhance allocation of the instructions into the various portions of a branch target buffer in accordance with an embodiment. As such, method 400 may be performed by BTB hardware and a BTB control circuit, alone or in combination with firmware and/or software, and may occur on an update path, in which the branch instruction is decoded and information provided in the instruction is known.

As shown, method 400 begins by decoding a branch instruction (block 410). In an embodiment an instruction decoder may decode the instruction and then provide it to further portions of a pipeline including a BTB. Next, at block 420 it may be determined whether the branch instruction is extended with hint information that may be present in one or more fields of the instruction. If not, control passes to block 430 where a default allocation policy may be used to allocate the branch instruction into a given portion of a branch target buffer (block 430). This default allocation policy may proceed in accordance with FIG. 3 discussed above, in an embodiment.

Otherwise if it is determined that the branch instruction is extended with this hint information, control passes to block 440 where an extension field of the branch instruction can be decoded. Different flavors of such extension fields may be present as described herein. Regardless of the particular hint information, control passes to block 450, where the branch instruction can be allocated into a given portion of the branch target buffer based on the extension field. Understand while shown at this high level in the embodiment of FIG. 4, many variations and alternatives are possible.

With the ISA hint information, one or a plurality of bits or other indicators of one or more instruction fields may be used to provide allocation information. In one embodiment, a branch instruction can include a single bit field to provide this hint information. This single bit field may be used to indicate a same page status, namely that a target address is expected to be in the same page as the address of the branch instruction. In an embodiment, a set value for this field (a logic "1") may be used to indicate the target is expected in the same page, and a reset value (a logic "0") may be used to indicate the target is expected in a different page. Note that in some cases this extension field may be controlled based on programmer selection of a given user-level branch instruction having this field. In other cases, this field may be programmed via a compiler based on individual workload characteristics as determined based on prior profiling information as to execution of the workload.

In one embodiment, the extension or hint field may be included in an instruction prefix portion of an instruction. In a particular embodiment, hint information may be included in a Group 2 instruction prefix of branch instructions. Although embodiments are not limited in this regard, branch instructions that may include hint information can include direct branch instructions including both conditional direct branch instructions (such as jump if condition met (JCC), JNZ and so forth) and unconditional branch instructions (such as function call (CALL), direct unconditional jump (JMP ADDR) and so forth), and indirect branch instructions (JMP % EAX). In yet other embodiments, hint information can be included in other portions of an instruction, such as based on opcode encoding, immediate data or so forth.

Of course, in other embodiments additional or different indicators may be present to provide hint information associated with branch instructions to enable preferential allocation in given segments of a branch target buffer in accordance with an embodiment. For example, in another embodiment at least some branch instructions of an ISA may provide for multiple indicators or bits within a hint field to provide hint information regarding preferential allocation of entries within particular segments of a BTB in accordance with an embodiment.

More specifically, described below in one example embodiment a hint field may include 5 different bits or indicators, each to provide a particular type of hint information. These hints may be enumerated as Bits 1-5, as follows:

Streaming indicator (Bit 1): This bit may be set to mark streaming code to indicate that those need not be allocated in BTB. If set, it indicates streaming code is in execution and therefore no allocation of new targets into a BTB is warranted.

Spatial indicator (Bit 2): This bit provides an indication on branch target distance from the branch PC. If it is set, the target is expected in a different page from the branch PC. Otherwise, the target is expected in the same page as the branch PC.

Popular indicator (Bit 3): This bit indicates a popular target and therefore is to be provided priority when allocating in the hot caches.

Phase indicator (Bit 4): This bit indicates that the program has entered a new phase and therefore prior entries with high confidence can be reset, which helps to prioritize allocation for incoming entries.

Override indicator (Bit 5): When set, this bit enables hints from software to be used in allocations/updates to the BTB. If not set, this bit overrides the other bits to indicate that the software layers cannot provide any hint and the underlying hardware can go with the default allocation/update policy.

Note that different flavors of ISA branch instructions can include all or a portion of these or other indicators in one or more hint fields of the instruction. Referring now to Table 2, shown are example encodings of hint information that may be included in a Group 2 instruction prefix of a call instruction of an ISA providing hint information in accordance with one embodiment. Of course other encodings and more or different hint information may be included for call and other branch instructions.

TABLE 2

Figure 5:
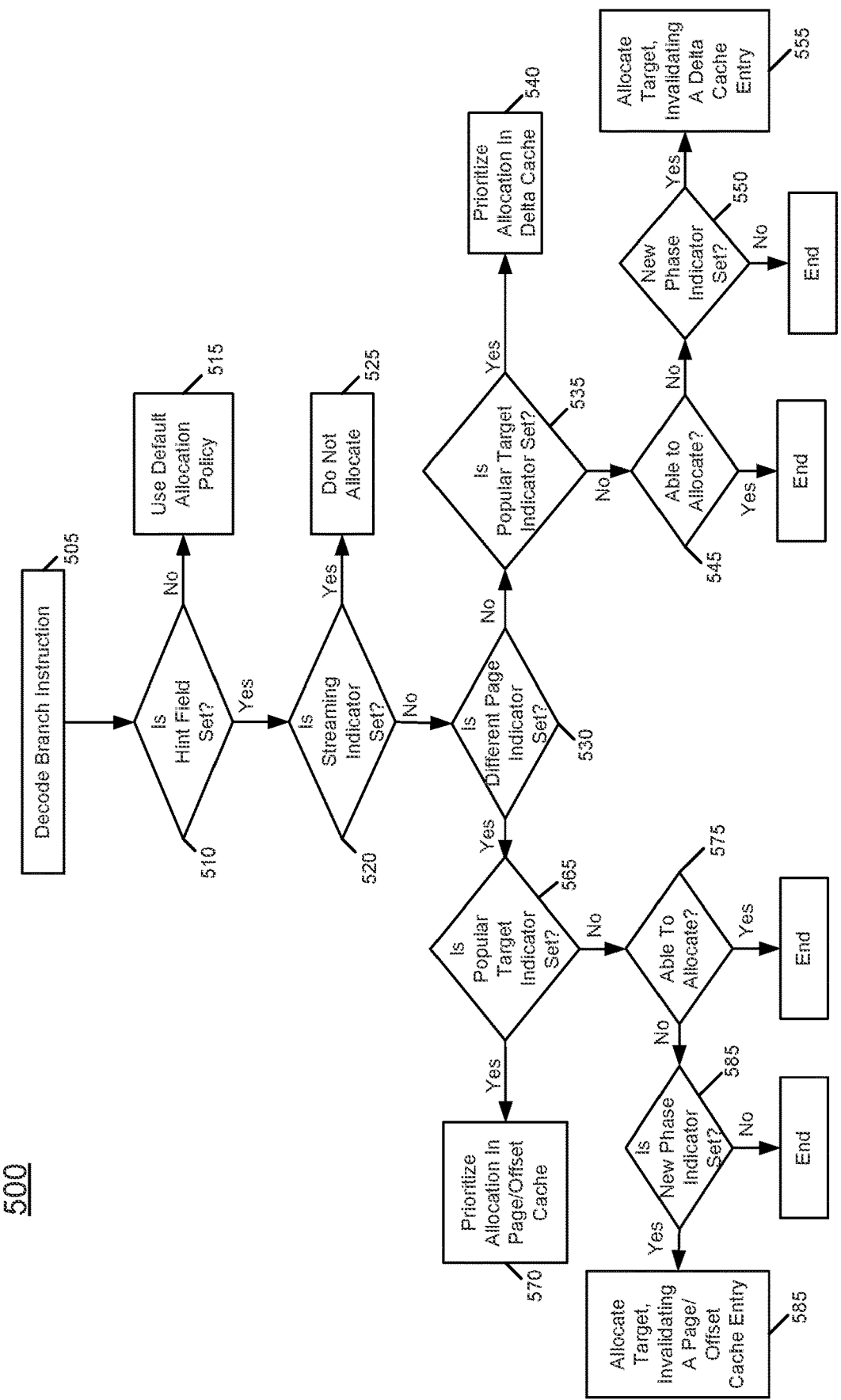
FIG. 5 is a flow diagram of a method in accordance with another embodiment.

00H - No Stream code
01H - Stream code
02H - Target in different page as branch
03H - Target in same page as branch In different situations, this hint information may be provided by a programmer within original code, or may be included by a compiler based at least in part on profiling information of actual code execution. Of course in still further embodiments other types of hint information may be present Referring now to FIG. 5, shown is a flow diagram of a method in accordance with another embodiment. More specifically, method 500 of FIG. 5 is a more detailed illustration of use of information included in branch instructions of an ISA to enhance allocation of the instructions into various portions of a branch target buffer in accordance with an embodiment. As such, method 500 may be performed by hardware circuitry of a branch predictor, such as a control circuit along with associated BTB hardware and a BTB control circuit, alone or in combination with firmware and/or software.

As shown, method 500 begins by decoding a branch instruction (block 505). In an embodiment an instruction decoder may decode the instruction. Next, at block 510 it may be determined whether the branch instruction is extended with a hint field that includes one or more hint indicators. If not, control passes to block 515 where a default allocation policy may be used to allocate the branch instruction into a given portion of a branch target buffer.

When it is determined that a hint field is present, control passes to diamond 520 to determine whether a streaming indicator within the field is set. If so, at block 525 the instruction is not allocated within a branch target buffer. That is, since the instruction is indicated to be part of streaming code, it will not be used again and thus there is no reason for allocation into the branch target buffer.

If the streaming indicator is not set, control passes to diamond 530 to determine whether a different page indicator is set (indicates branch and target are in different pages). If not, control next passes to diamond 535 where it is determined whether a popular target indicator is set. If so, allocation may be prioritized into a delta cache (block 540), and which may force an eviction of an existing entry, e.g., based on age/confidence metadata.

Otherwise if the popular target indicator is not set, next it is determined at diamond 545 whether the instruction is able to be allocated into the delta cache. Otherwise, it is determined whether a new phase indicator is set (diamond 550).

If the new phase indicator is not set, the instruction is not allocated. If the new phase indicator is set, control passes to block 555, where the target can be allocated, e.g., by invalidating a delta cache entry, into the delta cache.

Still with reference to FIG. 5, instead if the different page indicator is set (diamond 530), control passes to diamond 565 where it is determined whether a popular target indicator is set. If so, allocation may be prioritized into a page/offset cache (block 570).

Otherwise if the popular target indicator is not set, next it is determined at diamond 575 whether the instruction is able to be allocated into the page/offset cache. Otherwise, it is determined whether a new phase indicator is set (diamond 580). If the new phase indicator is not set, the instruction is not allocated. If the new phase indicator is set, control passes to block 585, where the target can be allocated, e.g., by invalidating a page/offset cache entry, into the page/offset cache. While shown at this high level in the embodiment of FIG. 5, many variations and alternatives are possible.

Of course in other implementations, other architectures of a BTB are possible. Notably, in such different implementations other architectures may be based on profiling of workloads to identify hot and cold branch PCs and to characterize the memory regions where the branch PCs and their targets fall. Based on such information, it may be possible to differently architect a BTB to leverage this information to provide for improved performance at a reduced BTB size.

Figure 6:
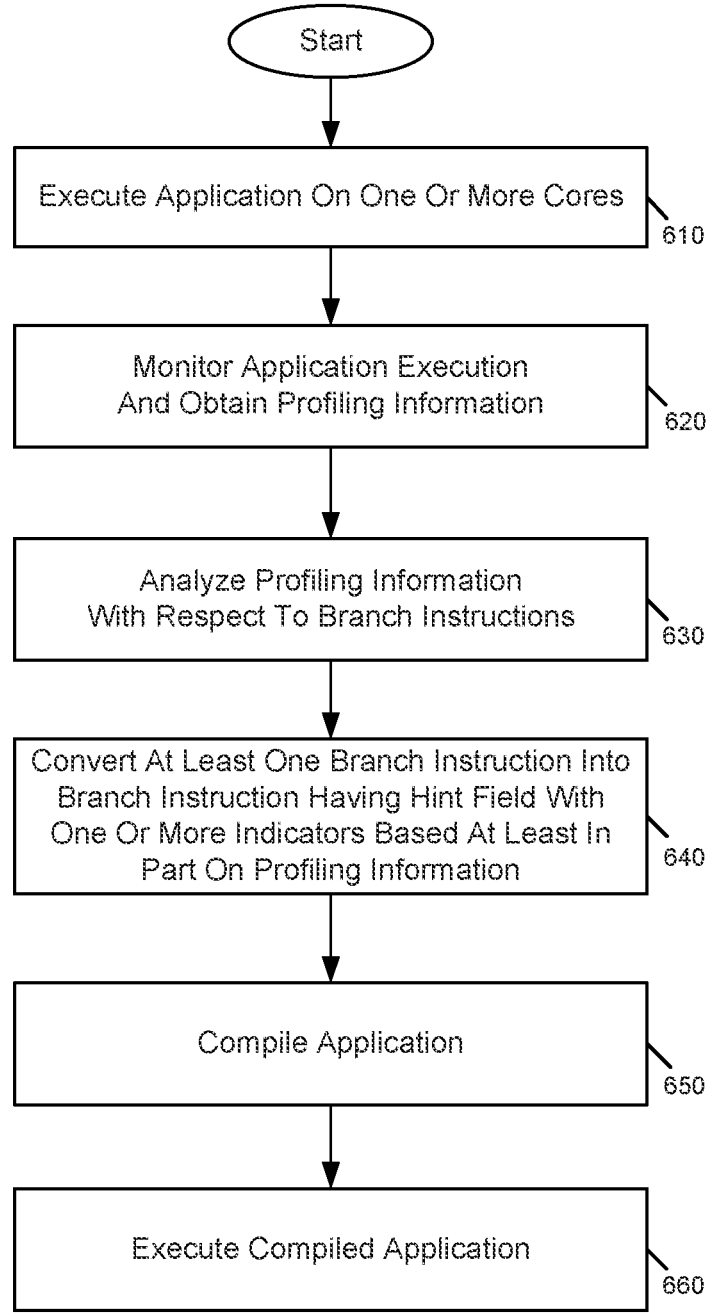
FIG. 6 is a flow diagram of a method in accordance with yet another embodiment.

Referring now to FIG. 6, shown is a flow diagram of a method in accordance with yet another embodiment. More specifically, method 600 of FIG. 6 is a method of optimizing code including branch instructions based on profiling information. In an embodiment, method 600 may be performed by hardware circuitry such as one or more cores of a system that executes a compiler, alone or in combination with firmware and/or software.

As shown in FIG. 6, method 600 may begin by executing an application on one or more cores (block 610). These cores may be multiple cores of a single SoC or can be cores of different processors. In any event, understand that these cores may include various branch prediction structures, including a branch predictor and a BTB. During application execution various monitoring may occur, e.g., using a performance monitoring circuit which may obtain profiling information. This profiling information with regard to branch instructions may include information as to spatial relationships between a branch address of a branch instruction and a target address of a corresponding target instruction, frequency of branch instruction execution, expected reuse distance, among other such information.

Next at block 630 this profiling information may be analyzed. More specifically, a compiler or other optimization engine may analyze the profiling information with respect to branch instructions. Then based at least in part on the profiling information, at least one branch instruction can be converted into a branch instruction having a hint field with one or more indicators (block 640). For example, a conventional branch instruction may be converted into a branch instruction in accordance with an embodiment that has a hint field including multiple indicators. Various ones of these indicators may be set based on the profiling information.

Still with reference to FIG. 6, at block 650 the application may be compiled to include these updated branch instructions. Finally, at block 660 the compiled application may be provided for execution, either on the system on which the compiler executes or one or more other systems. Understand while shown at this high level in the embodiment of FIG. 6, many variations and alternatives are possible In common workloads, it has been estimated that approximately 90% of the branches are direct branches and only 10% are indirect. As such, more resources may be provided for a hot cache than a target cache in embodiments. Several reasons exist for the varying characteristics based on program context. Specifically, direct conditional branches are used by forward conditionals (if . . . then . . . else) and loops. In most cases, these branches do not jump long distances and their targets are within the same page. These are the most commonly occurring branch type as well. Direct calls are used for making function calls. Except for inlined functions, others involve jumps to code regions outside the current one from where they are called. Hence, the targets of these branches are typically across pages. Direct jumps are mostly used for "goto label" (jump to specific location) or when optimizing the forward conditional for one common path and using a direct jump to skip over the alternate path. Finally, indirect branches are typically quite low in their occurrence count. They are used by virtual functions, function pointers and switch cases. Indirects have the highest miss intensity rate.

With embodiments, a BTB may be configured to lower mispredictions per kilo instruction (MPKI) and make it more efficient without increasing its size. As branch misprediction (and resteering) penalties increase as pipeline width and depth increase, any reduction in penalties due to branch misprediction or due to branch target misses (as in embodiments) directly translate to even higher performance gains.

Figure 7A:
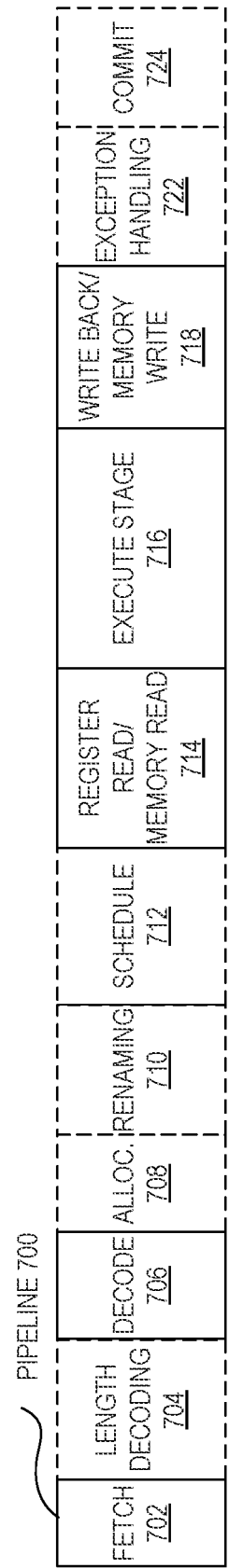
FIGS. 7A and 7B illustrate block diagrams of core architectures.
Figure 7B:
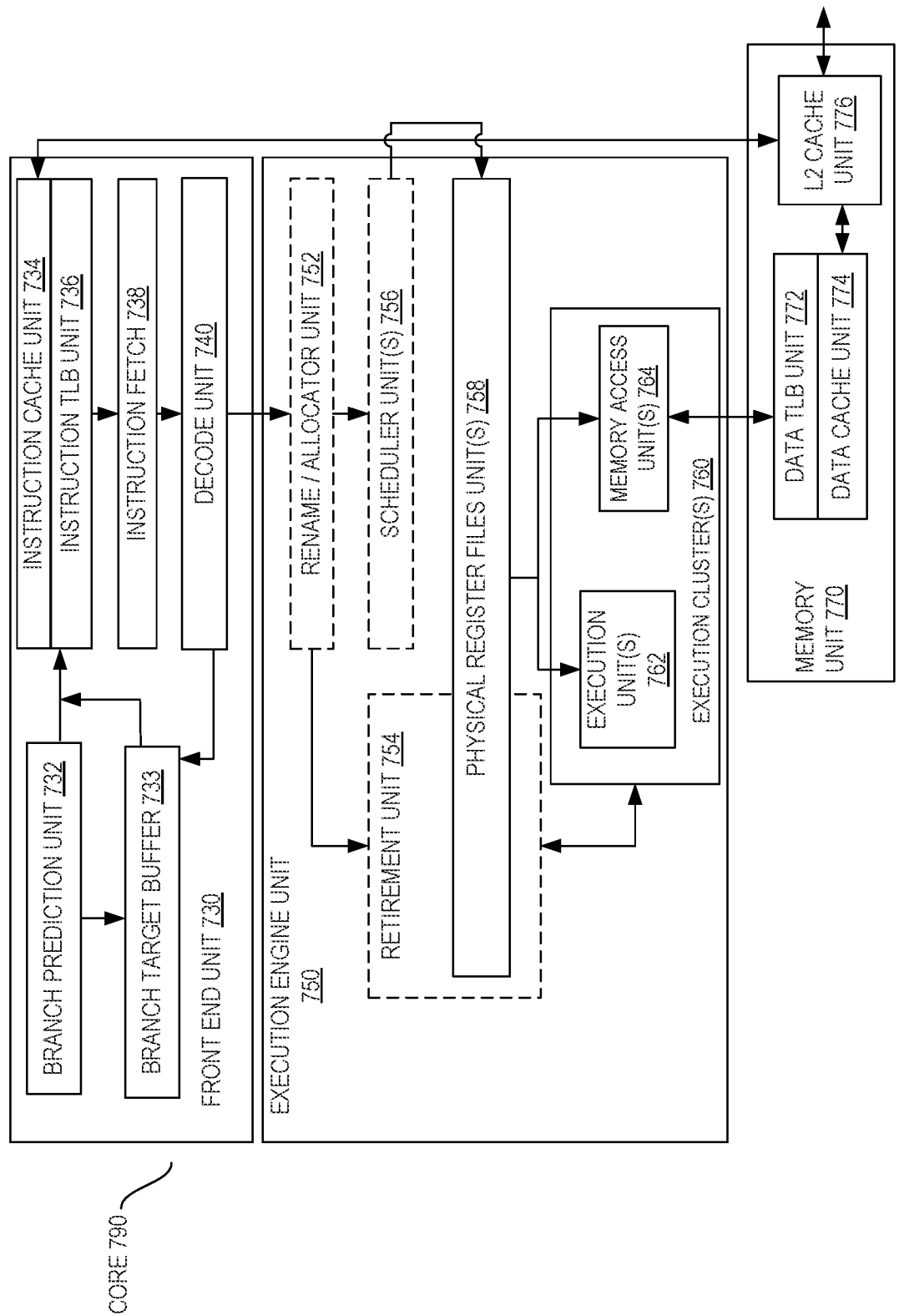

Understand that embodiments may be used in connection with many different processor architectures. FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. Such embodiments may include segmented BTBs and may execute branch instructions having hint information as described herein. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724. Note that as described herein, in a given embodiment a core may include multiple processing pipelines such as pipeline 700.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

As further shown in the front end unit 730, the branch prediction unit 732 provides prediction information to a branch target buffer 733, which may be a segmented BTB in accordance with an embodiment. The branch target buffer 733 may include control circuitry (such as shown in FIG. 1) to perform target predictions and updates as described herein. In this regard, the decode unit 740 may provided decoded branch instructions to the branch target buffer 733 to enable target allocations to be performed using hint information as described herein.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724. Note that various ones of the units described above can have their performance dynamically tuned using embodiments herein.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
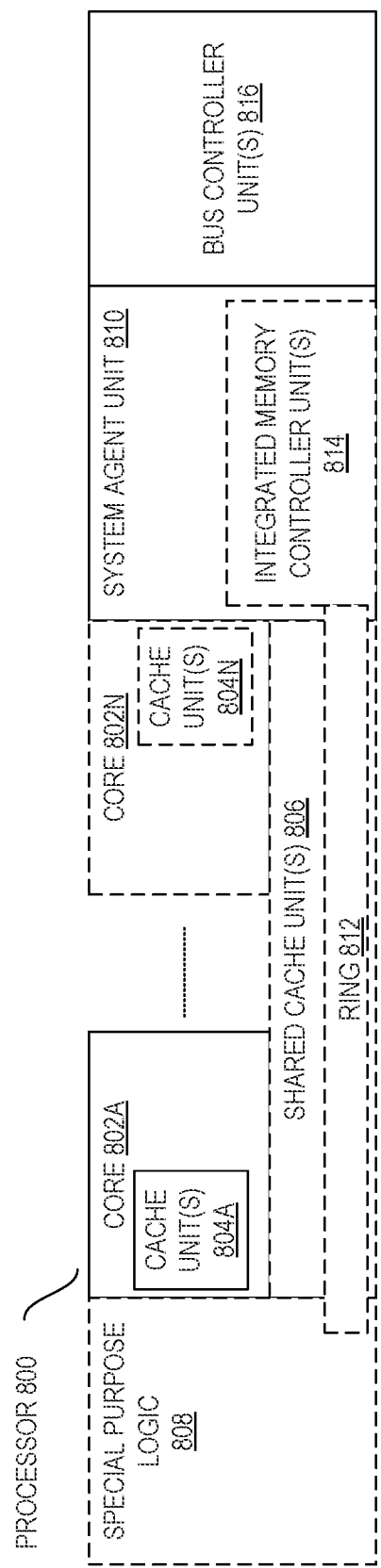
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) in the system agent unit 810, and a special purpose logic 808, which may perform one or more specific functions.

Thus, different implementations of the processor 800 may include: 1) a CPU with a special purpose logic being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache units 804A-N within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the special purpose 808, the set of shared cache units 806, and the system agent unit 810/integrated memory controller unit(s) 814, alternative embodiments may use any number of well-known techniques for interconnecting such units.

The system agent unit 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set. The cores 802A-N may include segmented BTBs as described herein.

Figure 9:
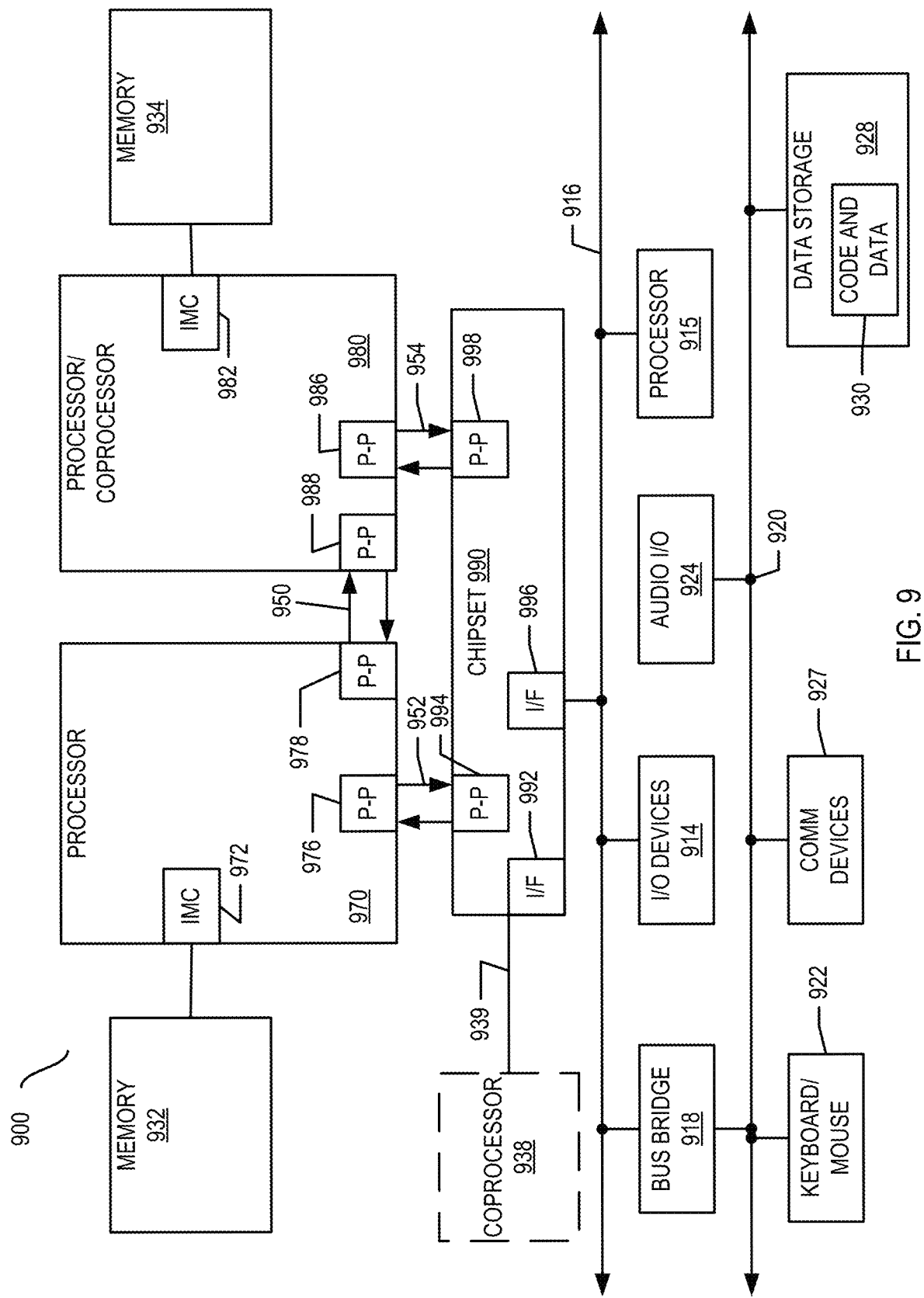
FIG. 9 is a block diagram of a first more specific exemplary system in accordance with an embodiment of the present invention.
Figure 10:
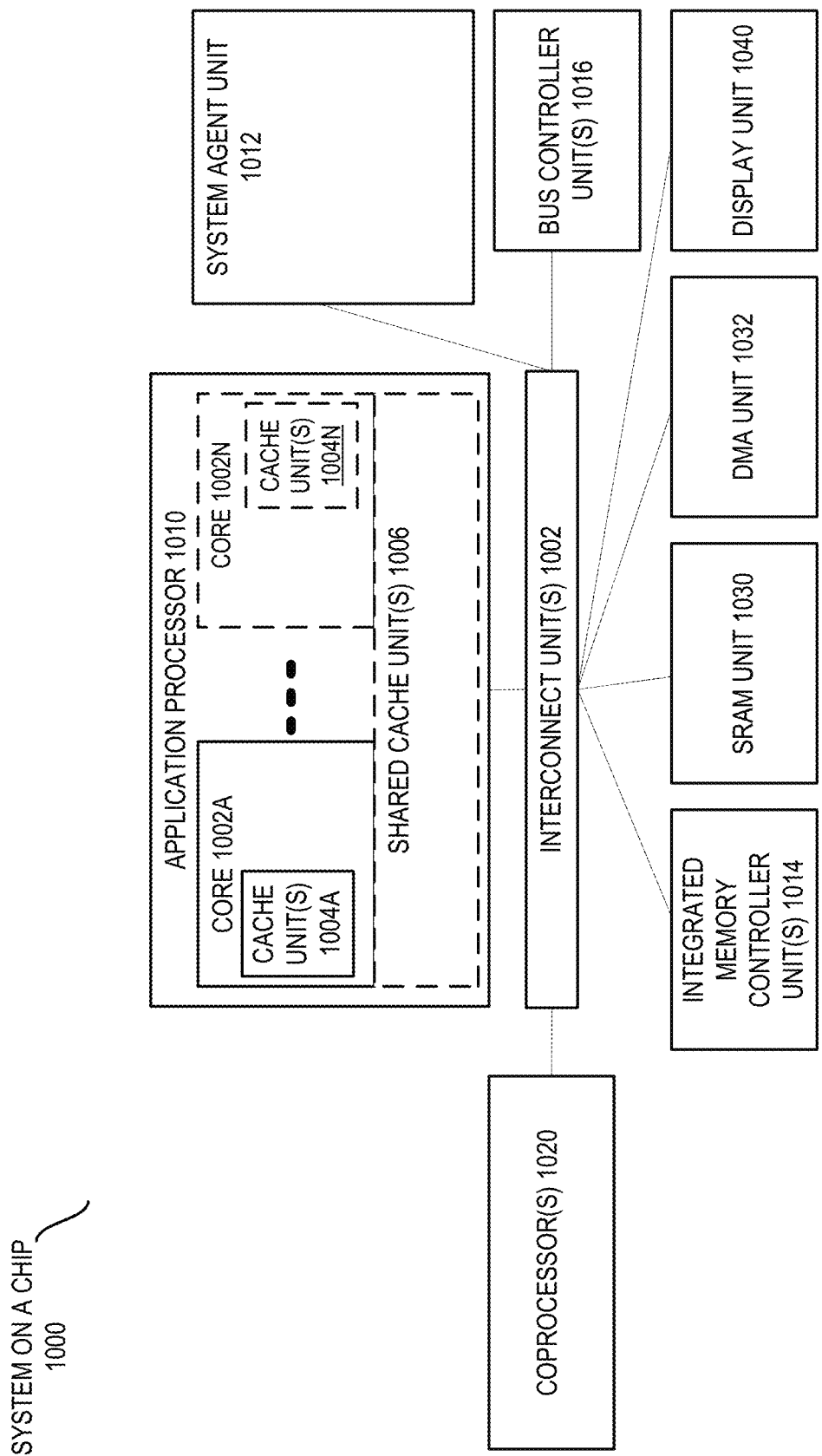
FIG. 10 is a block diagram of a SoC in accordance with an embodiment of the present invention.

FIGS. 9-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 800.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, integrated memory controllers (IMCs) 972 and 982 couple the processors to respective memories, namely a memory 932 and a memory 934, which may be portions of main memory locally attached to the respective processors. In embodiments processors 970, 980 may include segmented BTBs as described herein.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916.

In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Referring now to FIG. 10, shown is a block diagram of a SoC 1000 in accordance with an embodiment of the present invention. Dashed lined boxes are optional features on more advanced SoCs. In FIG. 10, an interconnect unit(s) 1002 is coupled to: an application processor 1010 which includes a set of one or more cores 1002A-N (including constituent cache units 1004A-N) at least some of which may include segmented BTBs as described herein; shared cache unit(s) 1006; a system agent unit 1012; a bus controller unit(s) 1016; an integrated memory controller unit(s) 1014; a set or one or more coprocessors 1020 which may include integrated graphics logic, an image processor, an audio processor, and a video processor; a static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
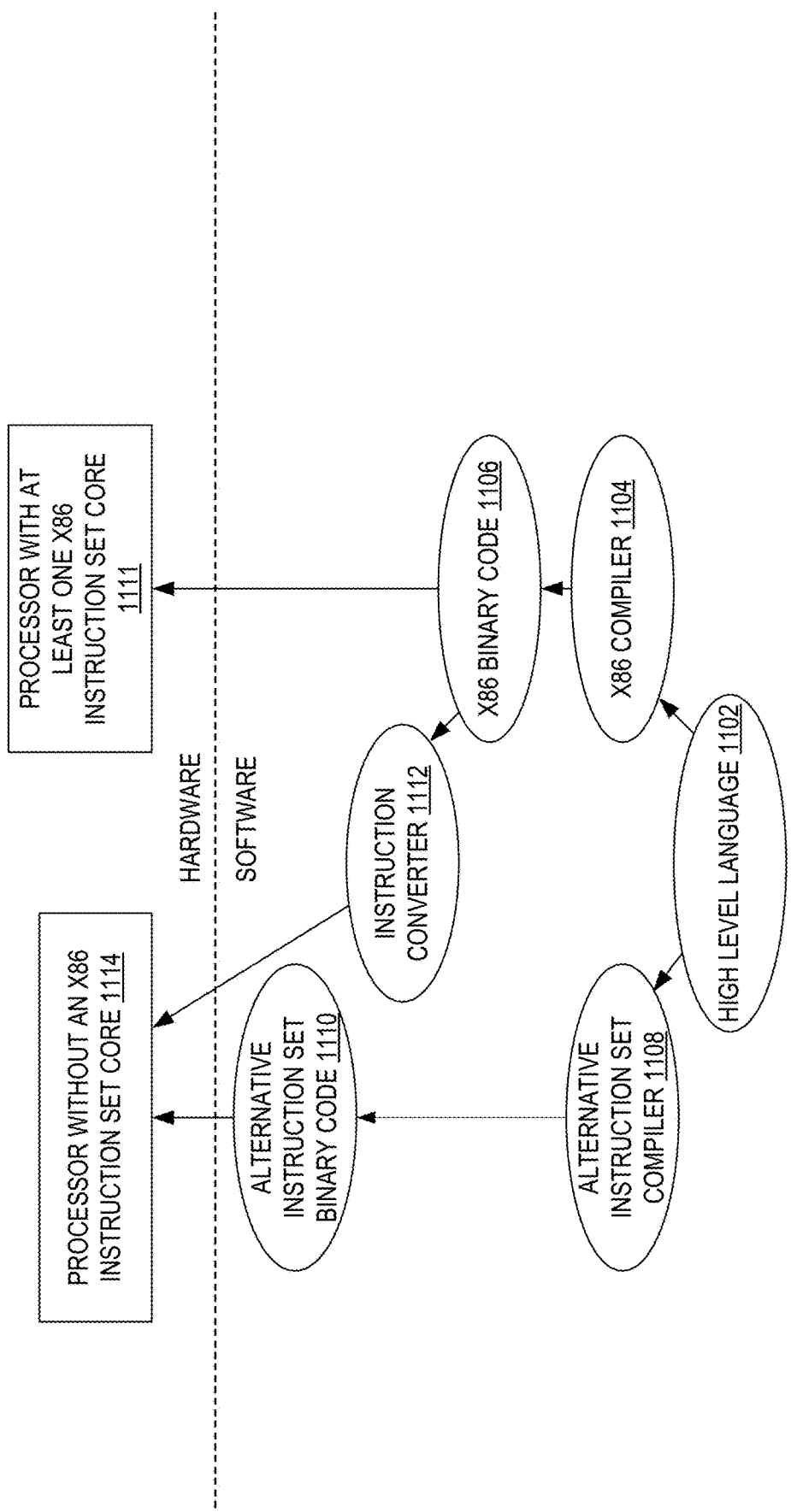
FIG. 11 is a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x186 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, CA and/or that execute the ARM instruction set of ARM Holdings of Sunnyvale, CA). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

The following examples pertain to further embodiments.

In one example, a processor includes: a branch predictor to predict whether a branch instruction is to be taken; and a BTB coupled to the branch predictor, the branch target buffer segmented into a first cache portion and a second cache portion. In response to an indication that the branch is to be taken, the BTB may access an entry in one of the first cache portion and the second cache portion based at least in part on a type of the branch instruction, an occurrence frequency of the branch instruction, and spatial information regarding a distance between a target address of a target of the branch instruction and an address of the branch instruction.

In an example, the BTB further comprises a control circuit to control allocation of the branch instruction into the BTB based at least in part on the type of the branch instruction.

In an example, the control circuit is to control the allocation of the branch instruction into the BTB further based at least in part on hint information included in the branch instruction.

In an example, the first cache portion comprises a target cache portion to store target prediction information for indirect branch instructions and infrequent direct branch instructions.

In an example, the second cache portion comprises a first sub-cache portion to store target prediction information for direct branch instructions having a target address within a same page as the branch instruction.

In an example, the second cache portion further comprises a second sub-cache portion to store target prediction information for direct branch instructions having a target address within a different page from the branch instruction.

In an example, the second sub-cache portion comprises: a first portion to store a page portion of the target prediction information; and a second portion to store offset information of the target prediction information.

In an example, the BTB further comprises a monitor circuit to receive a tag of the branch instruction address and direct the access to the first cache portion or the second cache portion based at least in part on the tag.

In an example, the processor further comprises a selection circuit coupled to the first cache portion and the second cache portion, where the selection circuit is provide an output from one of the first cache portion and the second cache portion based on an indicator from the monitor circuit.

In an example, the first cache portion comprises a first plurality of entries, each of the first plurality of entries to store at least some address information and metadata for a branch instruction.

In an example, the metadata comprises usefulness information and recency information.

In an example, the second cache portion comprises a second plurality of entries, each of the second plurality of entries to store a tag based on a hash of an address of a branch instruction and the target prediction information comprising a target address of the target of the branch instruction.

In another example, a processor includes at least one core to execute instructions, which may include a front end circuit comprising: a fetch circuit to fetch instructions; a decode circuit to decode the instructions; a branch predictor to predict whether a branch instruction is to be taken; and a BTB coupled to the branch predictor. The BTB may have a first portion only to store branch target information for direct branch instructions and a second portion to store branch target information at least for indirect branch instructions. The BTB further may have a control circuit to allocate a first direct branch instruction into the first portion and to allocate a first indirect branch instruction into the second portion, where the fetch circuit is to fetch a first target instruction using the branch target information for the first branch instruction. The at least one core further may include an execution circuit coupled to the front end circuit to execute at least the first target instruction.

In an example, the second portion is to further store branch target information for one or more direct branch instructions.

In an example, the control circuit is to promote the branch target information for at least one of the one or more direct branch instructions to the first portion based at least in part on a frequency of execution of the one or more direct branch instructions.

In an example, the control circuit is to allocate the first direct branch instruction into a first sub-portion of the first portion based at least in part on an extension field of the first direct branch instruction.

In another example, a system is to: receive, in a BTB of a core, a first direct branch instruction; identify the first direct branch instruction as a direct call instruction or another direct branch instruction; if the first direct branch instruction is identified as the direct call instruction, access a first cache portion of the BTB to obtain page address information and offset address information of a target of the first direct branch instruction and set a target address for a target of the first direct branch instruction using the page address information and offset address information; and if the first direct branch instruction is identified as the another direct branch instruction, access a second cache portion of the BTB to obtain delta information of the target of the first direct branch instruction and set the target address for the target of the first direct branch instruction based on the address of the first direct branch instruction and the delta information.

In an example, the system is to: identify a second branch instruction as an indirect branch instruction; and access a third cache portion of the BTB to obtain target address information of a target of the second branch instruction and set a target address for a target of the second branch instruction using the target address information.

In an example, the system is to evict the first direct branch instruction from the third cache portion when metadata associated with the first direct branch instruction stored in the first cache portion exceeds a threshold level.

In an example, the system is to allocate the first direct branch instruction to a selected one of the first cache portion and the second cache portion based at least in part on hint information associated with the first direct branch instruction.

In another example, a computer readable medium including instructions is to perform the operations of any of the above examples.

In another example, a computer readable medium including data is to be used by at least one machine to fabricate at least one integrated circuit to perform the operations of any one of the above examples.

In another example, an apparatus comprises means for performing the operations of any one of the above examples.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a branch predictor to predict whether a branch instruction is to be taken; and
   a branch target buffer (BTB) coupled to the branch predictor, the BTB segmented into:
   a first cache portion comprising a target cache portion to store target prediction information for indirect branch instructions and infrequent direct branch instructions; and
   a second cache portion comprising:

a first sub-cache portion to store target prediction information for direct branch instructions having a target address within a same page as the branch instruction;

a second sub-cache portion to store target prediction information for direct branch instructions having a target address within a different page from the branch instruction, wherein the second sub-cache portion comprises:

a first portion to store a page portion of the target prediction information; and a second portion to store offset information of the target prediction information;

wherein, in response to an indication that the branch instruction is to be taken, the BTB is to access an entry in one of the first cache portion and the second cache portion based at least in part on a type of the branch instruction, the type of the branch instruction comprising whether the branch instruction is a direct branch instruction or an indirect branch instruction, an occurrence frequency of the branch instruction, and spatial information regarding a distance between a target address of a target of the branch instruction and an address of the branch instruction.

2. The processor of claim 1, wherein the BTB further comprises a control circuit to control allocation of the branch instruction into the BTB based at least in part on the type of the branch instruction.

3. The processor of claim 2, wherein the control circuit is to control the allocation of the branch instruction into the BTB further based at least in part on hint information included in the branch instruction.

4. The processor of claim 1, wherein the BTB further comprises a monitor circuit to receive a tag of the address of the branch instruction and direct the access to the first cache portion or the second cache portion based at least in part on the tag.

5. The processor of claim 4, further comprising a selection circuit coupled to the first cache portion and the second cache portion, wherein the selection circuit is provide an output from one of the first cache portion and the second cache portion based on an indicator from the monitor circuit.

6. The processor of claim 1, wherein the first cache portion comprises a first plurality of entries, each of the first plurality of entries to store at least some address information and metadata for a branch instruction.

7. The processor of claim 6, wherein the metadata comprises usefulness information and recency information.

8. The processor of claim 7, wherein the second cache portion comprises a second plurality of entries, each of the second plurality of entries to store a tag based on a hash of an address of a branch instruction and the target prediction information comprising a target address of the target of the branch instruction.

9. A processor comprising:

at least one core to execute instructions, the at least one core comprising:

a front end circuit comprising:

a fetch circuit to fetch instructions;

a decode circuit to decode the instructions;

a branch predictor to predict whether a branch instruction is to be taken; and a branch target buffer (BTB) coupled to the branch predictor, the BTB having:

a first portion only to store branch target information for direct branch instructions, the first portion comprising a first sub-portion to store target prediction information for direct branch instructions having a target address within a same page as a corresponding direct branch instruction and a second sub-portion to store target prediction information for direct branch instructions having a target address within a different page from a corresponding direct branch instruction, the second sub-portion comprising a first part to store a page portion of the target prediction information and a second part to store offset information of the target prediction information;

a second portion to store branch target information at least for indirect branch instructions and branch target information for one or more direct branch instructions; and a control circuit to allocate a first direct branch instruction into the first portion and to allocate a first indirect branch instruction into the second portion, wherein the fetch circuit is to fetch a first target instruction using the branch target information for the first branch instruction, the control circuit to allocate the first direct branch instruction into the first sub-portion of the first portion based at least in part on an extension field of the first direct branch instruction, the extension field including hint information to provide allocation information, the hint information comprising an indication as to whether the first target instruction is expected in a same page as the first direct branch instruction; and an execution circuit coupled to the front end circuit to execute at least the first target instruction.

10. The processor of claim 9, wherein the control circuit is to promote the branch target information for at least one of the one or more direct branch instructions to the first portion based at least in part on a frequency of execution of the one or more direct branch instructions.

* * * * *